June 23, 1942.　　　N. E. KLEIN　　　2,287,623
DIRECTION FINDING APPARATUS
Filed Oct. 25, 1939　　　2 Sheets-Sheet 1

INVENTOR
NORMAN E. KLEIN
BY
ATTORNEY

June 23, 1942.   N. E. KLEIN   2,287,623
DIRECTION FINDING APPARATUS
Filed Oct. 25, 1939   2 Sheets-Sheet 2
FIG. 5.
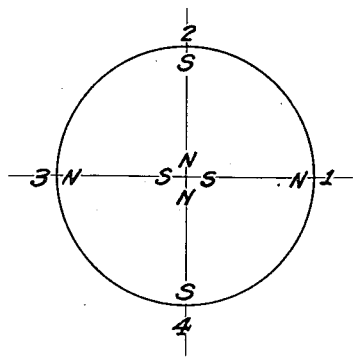
FIG. 6.
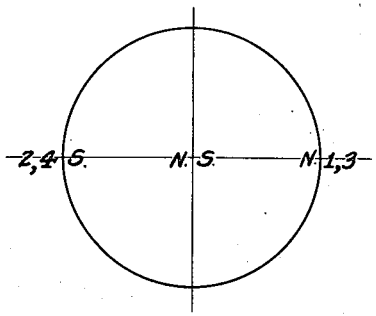
FIG. 7.
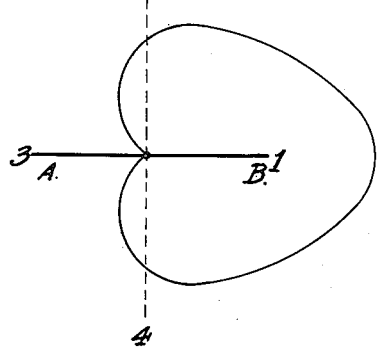
FIG. 9.
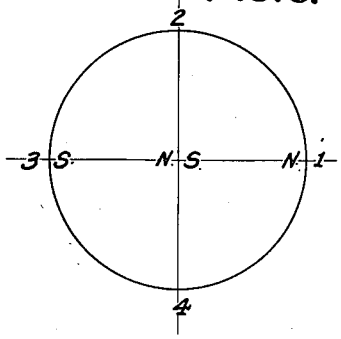
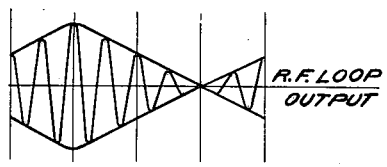 R.F. LOOP OUTPUT   FIG. 8a.
 RECTIFIED R.F.   FIG. 8b.
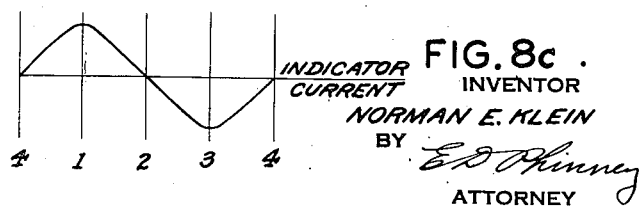 INDICATOR CURRENT   FIG. 8c.
INVENTOR
NORMAN E. KLEIN
BY
ATTORNEY Patented June 23, 1942

2,287,623

UNITED STATES PATENT OFFICE 2,287,623

DIRECTION FINDING APPARATUS

Norman E. Klein, Chicago, Ill., assignor, by mesne assignments, to International Telephone & Radio Manufacturing Corporation, a corporation of Delaware Application October 25, 1939, Serial No. 301,098

3 Claims. (Cl. 250—11)

My invention relates to direction finding apparatus and more specifically to an improved type of indicator for use with such apparatus.

An object of my invention is to provide an indicating device for use with direction finding apparatus of the type employing radio beams such that the direction of the beam is indicated directly.

A further object of my invention is to reduce the amount of apparatus necessary to give "sense" indications.

One type of direction finding system employs at the receiving end a loop type of antenna rotated at a regular rate. As is well known in the art, the loop antenna has directional properties, and in certain positions the antenna will contain maximum radio frequency currents. These currents are detected and amplified and used to actuate some form of indicating device.

A loop antenna without auxiliary equipment, however, gives 180° ambiguity in its direction indications, or in other words there are two positions of the loop antenna that will give maximum antenna current during one revolution of the antenna. There have been various systems devised to remove this ambiguity, among these being an open antenna or a reference or resistance generator employed with the loop antenna.

The present invention provides an indicating device for use with the loop antenna alone or with other auxiliary devices. The device is simple and rugged in design and has relatively few parts.

In my invention an electromagnet is revolved beneath a disc of copper or other non-magnetic material at a speed synchronous with that of the antenna speed or at twice the synchronous speed. This electromagnet is energized by the currents induced in the loop antenna after rectification and poles are set up in the disc depending on the position and energization of the electromagnet. A permanent magnet mounted on a pivot and on the same axis as the electromagnet takes up a position in agreement with these poles, and a pointer or needle indicates the direction of the incoming signal beam.

The invention may be more clearly understood by use of the attached drawings wherein:

Fig. 5 illustrates the magnetic poles induced in a disc above the electromagnet of my invention when the electromagnet is revolved at a speed synchronous with the rotation of loop antenna;

Fig. 6 illustrates the magnetic poles when the electromagnet revolves at twice the loop antenna speed;

Fig. 7 is a diagram of the field pattern surrounding a loop antenna provided with a sensing antenna;

Figs. 8a, 8b and 8c show the relation between the antenna current, receiver current, and indicator current using a loop antenna provided with a sensing antenna;

Fig. 9 illustrates the magnetic poles induced in a disc above the electromagnet of my invention when the electromagnet is revolved at a speed synchronous with a rotating loop antenna provided with a sensing antenna.

Figure 1:
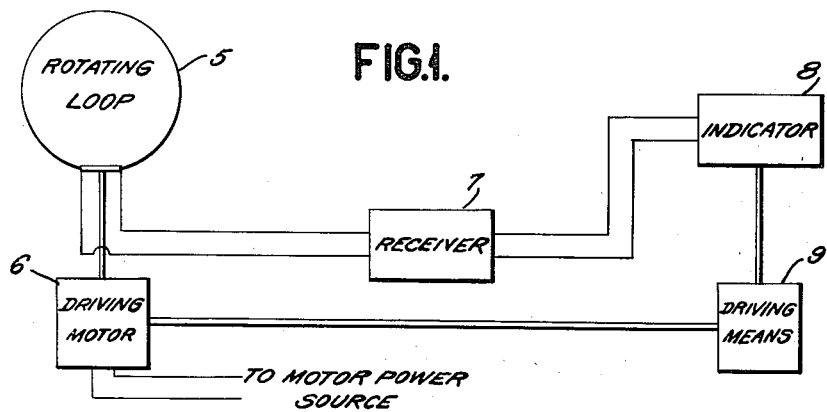
Fig. 1 is a diagram of receiving apparatus of a system of direction finding.

In Fig. 1 the rotating loop 5 is rotated by the driving motor 6. The currents induced in the rotating loop are detected and rectified by the receiver 7 and these currents are fed to the indicator 8. The moving parts of the indicator are rotated by a driving means 9 which may be driven at a speed synchronous with the speed of rotation of the loop or at some multiple of that rotation speed. The indicator is calibrated to give a relative indication of the direction of the incoming signal.

Figure 2:
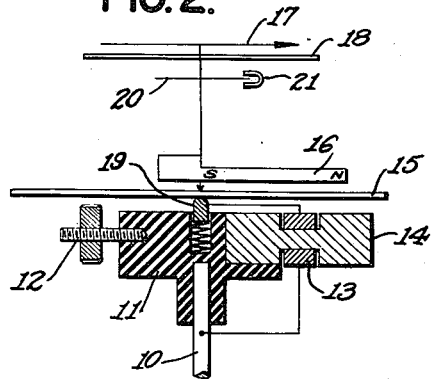
Fig. 2 is a partly sectioned side view of an indicating device according to the invention.

Fig. 2 shows an indicating device according to my invention. Shaft 10 is driven at a speed synchronous with the rotating loop speed or some multiple thereof and in turn drives the insulating member 11, the counter-weight and screw 12, and electromagnet 13 with its associated core 14. As the electromagnet and the associated members are rotated fields are set up in the copper or other non-magnetic material disc 15. A permanent magnet 16 will assume a position in agreement with these fields and in doing so will rotate the shaft and needle 17 and give an indication of the signal direction on the calibrated dial 18.

The disc 15 serves as a damping means for the permanent magnet or storage means for the magnetic field of the rotating electromagnet. It is possible to make this of magnetic material, but in its preferred form to eliminate residual magnetic effects the disc is composed of non-magnetic material. It is also possible to substitute some other means for damping the motion of the permanent magnet in place of this disc such as a damping vane or magnetic damping by means of a disc 20 and a permanent magnet 21 as shown in Fig. 2. In this case no disc is necessary, although it may be employed, and the permanent magnet will assume a position in agreement with the poles and at the point of maximum electromagnetic energy. When the disc is used, it is advantageous to employ auxiliary damping means to prevent indicator oscillations or vibrations.

Other devices responsive to the magnetic poles induced in the disc 15 may be employed. An example of this would be relays controlled by magnets placed around the disc, said magnets being responsive to maximum magnetic poles of a particular polarity.

A simple method of feeding the currents to the electromagnet 13 has been incorporated with this device. One lead of the electromagnet is connected to the shaft 10 whereas the other lead is connected to a contact 19. The currents are fed to these leads by means of the shaft 10 and through the copper disc 15 or its associated supporting members, disc 15 being stationary.

Figure 3:
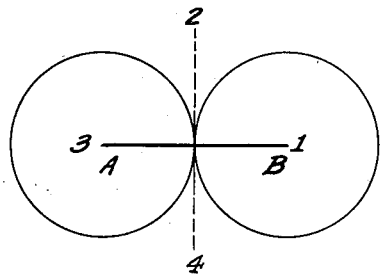
Fig. 3 is a diagram of the field pattern surrounding a loop antenna.

Figs. 3 through 6 should be used together to obtain an explanation of the positions and polarizations of the magnetic poles induced in the copper disc above the electromagnet of Fig. 2. In Fig. 3 a diagram of the field pattern surrounding the loop antenna is shown. At position 1 maximum radio frequency currents are induced in the loop as shown by Fig. 4a. At position 2 the current is a minimum. Similarly, the current in the loop varies from a maximum to a minimum at positions 3 and 4. In Fig. 4b the graph of the current after rectification in the receiver shows that the current is uni-directional and has the same frequency as the loop rotation. However, in Fig. 4c the current in the indicator is seen to be of twice the frequency of the loop rotation.

Figure 4A:
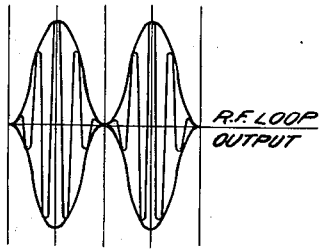
Figs. 4a, 4b and 4c show the relations between the antenna current, receiver current, and indicator current using a loop antenna.
Figure 4B:
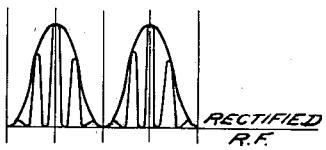
Figure 4C:

The effect of rotating the electromagnet at a speed synchronous with the loop speed upon the poles induced in the copper disc is shown in Fig. 5. At position 1 a north pole is induced near the outer edge and a south pole near the center. At position 2, since the current has reversed in the indicator as shown by Fig. 4c, a north pole is induced at the center of the disc and a south pole at the edge. This action may be followed through for positions 3 and 4, showing that four poles are induced in the disc when the electromagnet is rotated at this speed. It may be seen that in this case the permanent magnet driving the indicating needle may assume either of two positions. This effect is not at all desirable and must be removed.

In Fig. 6 a representation of the poles induced in the copper disc is shown when the electromagnet is driven at twice the speed of the rotating loop. The reference numbers 1, 3 and 2, 4 show how this is brought about assuming the indicator current to vary as in 4c. Under these conditions, the indicating needle can only assume a single position, and a further advantage is gained in rotating the electromagnet at twice the loop speed in that the poles receive twice the energization in one revolution of the loop that they would receive if the electromagnet were rotated at the loop speed.

In the above case, however, the needle gives merely an indication of the line of action of the signal beam and does not directly indicate the position of the signal source. To obtain a direct indication of the position it is necessary to combine the loop antenna with a sensing antenna of a well known type and to rotate the electromagnet at a speed synchronous with the loop speed. Figs. 7 through 9 illustrate the use of the indicating device of my invention with a loop antenna provided with a sensing antenna. Fig. 7 is a diagram of the field pattern surrounding a loop antenna provided with a sensing antenna.

In position 1 a maximum current traverses the loop antenna leads. In position 2 the current has reduced but does not reach a minimum until in position 3, and increases again as the loop is rotated into position 4, as shown by Fig. 8a.

The current from the loop after detection is uni-directional and of half the frequency of the loop rotation as shown by Fig. 8b. Fig. 8c shows that the indicator current now has the same frequency as the frequency of rotation of the loop. In this case the electromagnet may be revolved at a speed synchronous with that of the rotating loop and poles will be induced in the copper disc which will allow the permanent magnet attached to the indicating needle to assume only a single position as shown by Fig. 9, and this position is indicative of the location of the signal source.

The removal of 180° ambiguity in signal beam direction determination by the use of this indicator is clearly shown by the above explanations. This indicator, however, is not necessarily restricted to use with direction finding apparatus but may be used in any system where indications of cyclic energization are required.

While I have set forth particular embodiments of my invention for the purposes of illustration, it will be understood that various modifications and adaptations thereof may be made within the spirit of the invention as set forth in the appended claims.

What is claimed is:

1. An indicating device comprising an electromagnet rotatable about an axis adjacent one end thereof, means for producing cyclical current variations in said electromagnet, means for rotating said electromagnet in timed relation with said current variations, a disc of electrical conductive material which has the characteristic of producing localized magnetic poles whose orientation is determined by the periodicity of said current variations and the rate of rotation of said electromagnet, said disc being mounted substantially perpendicular to the axis of rotation of said electromagnet, and a rotatable indicating magnet positionally responsive to the orientation of said localized poles in said disc and mounted so that said disc is between said electromagnet and said indicating magnet.

2. An arrangement for indicating the direction of a signal transmitter such as a radio transmitter, comprising a directionally sensitive rotating loop antenna located at a remote point from said transmitter and energized by signals from said transmitter, means to rectify the signals as intercepted by said antenna, and means to translate said signals into a visual indication of the orientation of said point with respect to said transmitter, the last-mentioned means including an electromagnet rotating about an axis adjacent one end thereof in timed relation to the rotation of said antenna, a metallic disc having the characteristic of producing localized magnetic poles when subjected to the action of said electromagnet when the electromagnet is rotated at the same rotational speed or a multiple of the rotational speed of said antenna, said disc being mounted substantially perpendicular to the axis of rotation of said electromagnet, and an indicating magnet mounted so as to extend from a central region of said disc towards the periphery thereof, said indicator magnet being positionally oriented in accordance with the orientation of said magnetic poles.

3. An arrangement according to claim 2 in which the antenna is directionally sensitive and is provided with means to provide a sense of direction signal and said electromagnet is rotated at the same rate as said loop whereby there are produced on said disc, four localized poles in substantial linear array, two of the poles being of opposite sign and located at the central region of the disc and the other two poles being of opposite sign and located towards the periphery of the disc and said indicating magnet is directionally oriented by said poles to give the direction and sense of direction of the transmitter with respect to said point.

NORMAN E. KLEIN.